(12) United States Patent
Miller-Jupp

(10) Patent No.: US 9,677,161 B2
(45) Date of Patent: Jun. 13, 2017

(54) METHOD AND APPARATUS FOR THERMALLY TREATING AN ALUMINIUM WORKPIECE AND ALUMINIUM WORKPIECE

(71) Applicant: Simon Miller-Jupp, Bonn (DE)

(72) Inventor: Simon Miller-Jupp, Bonn (DE)

(73) Assignee: Hydro Aluminium Rolled Products GmbH, Grevenbroich (DE)

( * ) Notice: Subject to any disclaimer, the term of this patent is extended or adjusted under 35 U.S.C. 154(b) by 0 days.

(21) Appl. No.: 14/663,661

(22) Filed: Mar. 20, 2015

(65) Prior Publication Data

US 2015/0191811 A1    Jul. 9, 2015

Related U.S. Application Data

(63) Continuation of application No. PCT/EP2013/070096, filed on Sep. 26, 2013.

(30) Foreign Application Priority Data

Sep. 27, 2012 (EP) .................................... 12186327

(51) Int. Cl.
*C22F 1/047* (2006.01)
*C21D 9/00* (2006.01)
(Continued)

(52) U.S. Cl.
CPC .............. *C22F 1/047* (2013.01); *B62D 25/04* (2013.01); *B62D 29/008* (2013.01); *C21D 9/0062* (2013.01); *C22C 21/00* (2013.01); *C22C 21/04* (2013.01); *C22C 21/08* (2013.01); *C22F 1/04* (2013.01)

(58) Field of Classification Search
CPC .......... C22F 1/047; B62D 25/04; B62D 29/00
See application file for complete search history.

(56) References Cited

U.S. PATENT DOCUMENTS 4,082,578 A * 4/1978 Evancho et al. .............. 148/535
5,547,524 A    8/1996 Sainfort et al.
(Continued)

FOREIGN PATENT DOCUMENTS

CN    101815804 A    8/2010
JP    55-054228 A    4/1980
(Continued)

*Primary Examiner* — Rebecca Lee
(74) *Attorney, Agent, or Firm* — Reinhart Boerner Van Deuren P.C.

(57) ABSTRACT

The invention relates to a method for thermally treating an aluminium workpiece, comprising the steps of providing an aluminium workpiece, which is essentially in the T4 structural state, and exposing a first portion of the workpiece to a first precipitation hardening process by artificial ageing to change the structural state of the first portion of the workpiece, wherein a part of the workpiece is actively cooled during the first precipitation hardening process, so that a second portion of the workpiece essentially remains in the same structural state during the first precipitation hardening process. The invention further relates to an apparatus for thermally treating an aluminium workpiece and to an aluminium workpiece, especially producible with a method according to the invention.

8 Claims, 10 Drawing Sheets

(51) Int. Cl.

| | | |
|---|---|---|
| *C22C 21/00* | (2006.01) | |
| *C22F 1/04* | (2006.01) | |
| *B62D 25/04* | (2006.01) | |
| *B62D 29/00* | (2006.01) | |
| *C22C 21/04* | (2006.01) | |
| *C22C 21/08* | (2006.01) | |

(56) References Cited

U.S. PATENT DOCUMENTS

| | | | |
|---|---|---|---|
| 5,976,456 A | * | 11/1999 | Ziani et al. ............ 419/31 |
| 2005/0000609 A1 | * | 1/2005 | Butler et al. ............ 148/702 |
| 2005/0217770 A1 | | 10/2005 | Lequeu et al. |
| 2009/0090437 A1 | | 4/2009 | ten Cate et al. |

FOREIGN PATENT DOCUMENTS

| | | |
|---|---|---|
| JP | 2009-255104 A | 11/2009 |
| JP | 2010-194589 A | 9/2010 |
| RU | 2 266 348 C2 | 12/2005 |
| RU | 2 345 172 C2 | 1/2009 |

\* cited by examiner

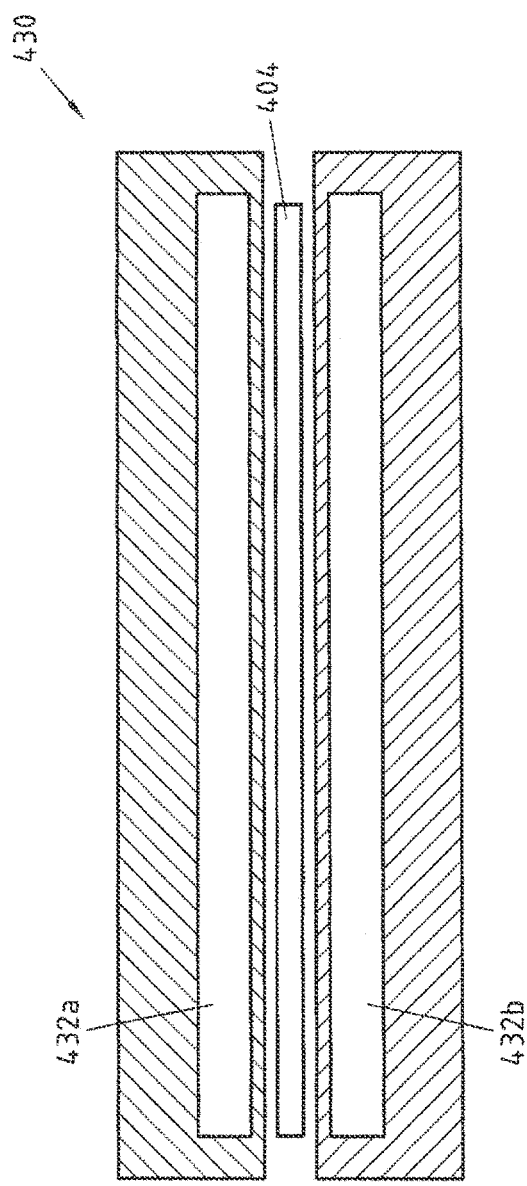

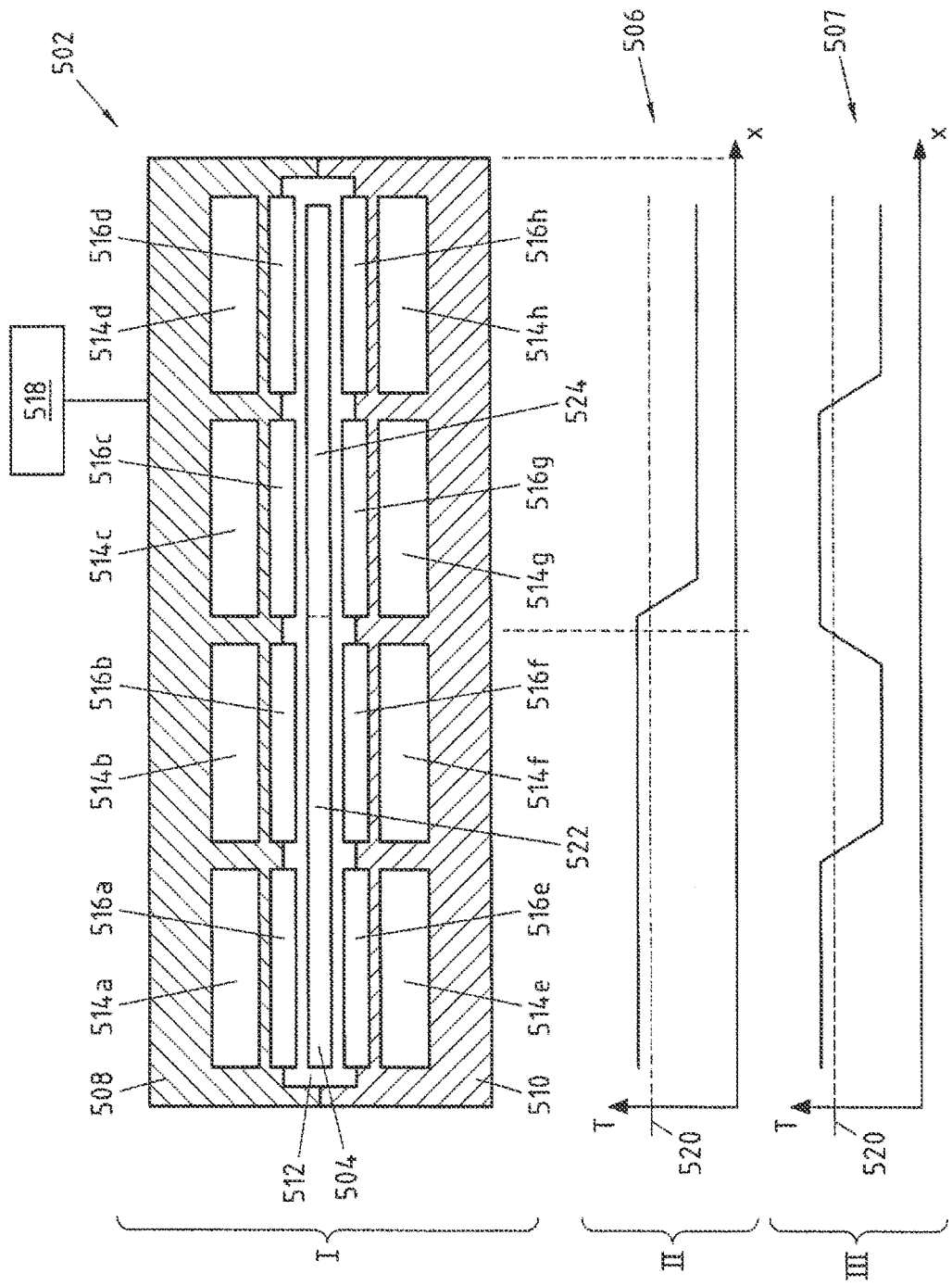

METHOD AND APPARATUS FOR THERMALLY TREATING AN ALUMINIUM WORKPIECE AND ALUMINIUM WORKPIECE

CROSS-REFERENCE TO RELATED PATENT APPLICATIONS

This patent application is a continuation of PCT/EP2013/070096, filed Sep. 26, 2013, which claims priority to European Application No. 12 186 327.8, filed Sep. 27, 2012, the entire teachings and disclosures of which are incorporated herein by reference thereto.

FIELD OF THE INVENTION

The invention relates to a method for thermally treating an aluminium workpiece, comprising the steps of providing an aluminium workpiece, which is essentially in the T4 structural state and exposing a first portion of the workpiece to a first precipitation hardening process by artificial ageing to change the structural state of the first portion of the workpiece.

The invention further relates to an apparatus for thermally treating an aluminium workpiece, especially for carrying out a method as mentioned above, comprising a treatment room configured to accommodate at least a part of an aluminium workpiece during a thermal treatment and heating means configured to heat up at least that portion of an aluminium workpiece which is located in a heating zone of the treatment room.

The invention still further relates to an aluminium workpiece, especially producible with a method as stated above.

BACKGROUND OF THE INVENTION

Aluminium workpieces are widely used as structural components in industrial construction, especially to replace heavier steel components. However, for some applications it is difficult to find aluminium workpieces which offer similar structural characteristics as according steel structures they are supposed to replace. Especially one-piece steel workpieces comprising sections with different material characteristics such as strength or ductility are difficult to replace with adequate aluminium workpieces.

For steel production there are known techniques in the art like for example press hardening, which allow manufacturing one-piece workpieces with sections of different material characteristics. These techniques exploit the high sensitivity of steel microstructure to the quenching rate in a hardening process as well as its low thermal conductivity. Due to these properties different parts of a steel workpiece can be exposed to very different temperature gradients during quenching to achieve different structure states with different material characteristics.

These methods are usually not applicable to aluminium workpieces as aluminium alloys have a higher thermal conductivity so that temperature differences between different parts of a workpiece are leveled out faster. Moreover, it is usually necessary to keep an aluminium workpiece at a specific temperature for an extended and defined time to achieve a specific structure state rather than only exposing the workpiece to a certain quenching rate.

In some cases it may be possible to replace a one-piece steel workpiece by a multiple-piece aluminium workpiece which is composed of at least two aluminium workpieces having different material characteristics which are joined together. The joining of workpieces by for example welding or soldering is however not always possible and also introduces weak points into the workpiece. Therefore there is a general need for one-piece aluminium workpieces with portions of different material characteristics.

SUMMARY OF THE INVENTION

The object of the invention is therefore to provide a method and an apparatus for thermally treating an aluminium workpiece with which an aluminium workpiece can be produced having portions of different material characteristics such as strength or ductility. It is also an object of the invention to provide such an aluminium workpiece.

This object is solved for a method as stated in the outset in that a part of the workpiece is actively cooled during the first precipitation hardening process, so that a second portion of the workpiece essentially remains in the same structural state during the first precipitation hardening process.

Active cooling of a part of a workpiece prevents a second portion of the workpiece from direct heating and/or indirect heating by heat transfer from the first portion to the second portion of the workpiece. The temperature in the second portion may be kept below an artificial hardening temperature while at the same time the temperature in the first portion is above the artificial hardening temperature. Therefore only the first portion of the workpiece undergoes a structural state change while the structural state of the second portion essentially remains unchanged.

Throughout this application an aluminium workpiece is understood to encompass metal workpieces or mainly metal workpieces which are essentially made of aluminium or an aluminium alloy. The aluminium alloy may especially be of type AA 2XXX or AA 6XXX or AA 7XXX. The term "workpiece" further encompasses sheets, preformed workpieces and cast workpieces. Furthermore the workpieces are especially understood to be one-piece, i.e. the first and the second portion of the workpieces are not parts of different workpieces which were joined together.

An artificial ageing temperature is a temperature which is high enough to cause an aluminium workpiece undergoing artificial ageing, i.e. a structural state change due to the exposure to heat. The minimum artificial ageing temperature depends on the aluminium alloy of the workpiece, but it is generally at least 90° C. The minimal artificial ageing temperature may preferably also be at least 150° C., especially for 6XXX alloys.

The part of the workpiece which is actively cooled may agree with the second portion of the workpiece. However, the second portion may also enclose a part of the workpiece which is not directly cooled but separated from the first portion of the workpiece by the actively cooled part of the workpiece.

The structural state of the aluminium workpieces refers to the microstructure of the aluminium or aluminium alloy, i.e. to the structure and configuration of the grains and precipitates.

The T4 structural state of aluminium or an aluminium alloy is a microstructure achieved by solution annealing, subsequent quenching and optionally subsequent natural ageing of the workpiece. Solution annealing is a heat treatment in which the workpiece is held at a high temperature, such that the desired elements are held in solid solution, but below the melting temperature for a specific time to achieve an essentially solid solution crystal structure within the workpiece. Typical solution annealing temperatures are between 300 and 600° C. Typical solution annealing times are between 15 minutes and 24 h. The solution annealing times are dependent upon the thickness of the workpiece, so that thicker workpieces require a longer solution annealing time. During quenching the workpiece is subjected to rapid cooling from the solution annealing temperature to or below 200° C., preferably to or below 150° C. During natural ageing the aluminium workpiece is stored at ambient temperatures for several days, typically between 5 and 8 days.

The T4 structural state can be altered by natural or artificial ageing to increase the strength of the workpiece. During artificial ageing the workpiece is exposed to an elevated temperature, typically between 90° C. and 200° C., for a specific length of time, typically for between 20 minutes and 9 days, preferably 1 to 2 days at a moderate precipitation hardening temperature.

The artificial ageing turns the T4 structure into a T6 structure by formation of precipitates. This process is therefore also called precipitation hardening process. The T6 structural state offers very high strength of the workpiece. To achieve the maximum strength of a workpiece portion, the portion has to be held at a certain temperature for a specific time, which depends on the alloy of the workpiece.

When the exposure time or temperatures exceed the values for the highest strength the aluminium workpiece structure turns into an overaged state, the T7 structural state. In this structural state the ductility and elongation at break, respectively, of the workpiece is improved at expense of the mechanical strength.

The T5 state is achieved by quenching, for example by air or water, a workpiece that has been formed at or above the solution annealing temperature followed by an artificial ageing treatment similar in nature to that used to create the T6 state. The T5 state has similar mechanical properties to that of the T6 state, or—should over-ageing be applied—of the T7 state. All further references to T6 or T7 should be considered applicable when starting from the T5 condition.

The temper designations of the T4, T5, T6 and T7 structural states are especially in accordance with the definitions in ANSI H35.1, EN515 and ISO 2107.

In a first preferred embodiment of the method according to the invention the method further comprises the step of exposing the workpiece to a second precipitation hardening process by artificial ageing to change the structural state of the first and the second portion of the workpiece.

By a combination of the first and the second precipitation hardening processes it is possible to achieve different portions of the workpiece having T6 or T7 structural states and therefore different characteristics like strength or ductility.

The second precipitation hardening process may comprise an overall artificial ageing of the workpiece or only a partial artificial ageing comprising artificial ageing of the first and second portion of the workpiece. Partial artificial ageing during the second precipitation hardening allows having third portions of the workpiece in the T4 structural state at the end of the heat treatment.

According to a further embodiment of the method the first portion of the workpiece is essentially in the T7 structural state and the second portion of the workpiece is essentially in the T6 structural state after the first and the second precipitation hardening processes. With this embodiment an aluminium workpiece can be produced which comprises a first portion with very high strength (T6 structural state) and a second portion with lower strength but higher ductility (T7 structural state).

According to a further embodiment of the method the second precipitation hardening process is carried out after the first precipitation hardening process. In this embodiment the first precipitation hardening process causes the first portion of the workpiece to change from the T4 to the T6 structural state, while the second portion essentially remains in the T4 structural state. During the second precipitation hardening process, the first portion then changes from the T6 to the T7 structural state of the second portion while the T4 structural state turns to the T6 structural state giving highest strength there.

In another embodiment of the method the first precipitation hardening process is carried out after the second precipitation hardening process. In this embodiment both the first and the second portion of the workpiece are turned from T4 to essentially T6 structural state during the second precipitation hardening process. During the first precipitation hardening process carried out subsequently the first portion then changes from the T6 to the T7 structural state while the second portion essentially remains in the T6 state.

In a further embodiment of the method the aluminium workpiece is made from an AA 2xxx or AA 6XXX or an AA 7XXX aluminium alloy. AA (Aluminium Association) 2XXX alloys are aluminium alloys with copper as the main alloy component. AA 6XXX alloys are aluminium alloys with magnesium and silicon as main alloy components. AA 7XXX alloys are aluminium alloys with zinc as main alloy component. These alloys yield high strengths during precipitation hardening. It is especially preferred to use AA6070 or alloys within the AA system of even higher maximum strength in the T6 structural state, so that the aluminium workpiece may offer sufficient strength to replace steel components with high strength demands. AA 6082 and AA 6009 are further examples of preferred alloys.

Aluminium workpieces are often painted during production and therefore also often subjected to a paint baking step to cure, dry and/or burn in the paint. Especially, aluminium components used in vehicle body production as in the body-in-white (BIW) stage are subjected to paint baking. During paint baking the aluminium workpiece is typically subjected to temperatures of between 150 to 200° C., especially of about 180° C. for 10 to 40 minutes, especially about 20 minutes. These temperatures and time lengths are suitable to cause a precipitation hardening in the workpiece. This embodiment combines two process steps so that the production of the aluminium workpiece can be rendered more efficiently. Therefore, the aluminium workpiece used for the method according to the invention is preferably a component in the body-in-white stage.

The first and/or second precipitation hardening processes of the methods described above may be carried out in an artificial ageing room which is heated to an artificial ageing temperature. During the first precipitation hardening process a cooling device, especially a heat exchanger, may be in thermal contact with the aluminium workpiece to actively cool a part of the workpiece during the first precipitation hardening process. Especially the cooling device may be attached to the part of the workpiece. In case also a second precipitation hardening process is carried out, the cooling device may be detached and/or turned off. Of course it is also possible to perform the method as described above on multiple aluminium workpieces within the same artificial ageing room at the same time.

The methods described above may preferably be carried out using a special apparatus which is described in the following.

The object of the invention is further solved with an apparatus for thermally treating an aluminium workpiece, especially for carrying out a method as described above, comprising a treatment room configured to accommodate at least a part of an aluminium workpiece during a thermal treatment and heating means configured to heat up at least that portion of an aluminium workpiece which is located in a heating zone of the treatment room, in that the apparatus further comprises cooling means configured to actively cool at least that portion of an aluminium workpiece which is located in a cooling zone of the treatment room.

This feature has the effect that during the thermal treatment of an aluminium workpiece accommodated in the treatment room the portion of the aluminium workpiece located in the cooling zone of the treatment room can be actively cooled. This allows to thermally isolate different sections of the workpiece wherein the cooling acts as a thermal barrier by actively preventing the transfer of heat from the portion of the aluminium workpiece located in the heating zone to the portion within the cooling zone or to another portion of the workpiece which is separated from the portion in the heating zone by the portion in the cooling zone.

The cooling means are preferably configured to keep the portion of the workpiece in the cooling zone below an artificial ageing temperature, especially below 100° C., while the portion of the workpiece located in the heating zone is heated up to or above an artificial ageing temperature, especially above 100° C.

The treatment room is understood to designate a room of the apparatus which at least in part is enclosed by structural components of the apparatus such as wall components. The treatment room has an access so that an aluminium workpiece may at least partly be placed within the room for thermal treatment. The treatment room can be completely closable or remain partly open during the heat treatment. Preferably the treatment room is configured as a furnace chamber or as an artificial ageing room. The treatment room can of course be configured to accommodate multiple aluminium workpieces, so that the multiple aluminium workpieces can be thermally treated within the apparatus at the same time.

The heating means are preferably configured to heat the portion of the workpiece in the heating zone to or above an artificial ageing temperature, especially above 100° C. The heating means may be for instance gas heating means or electrical heating means involving contact heating, radiation heating and/or inductive heating. For example the heating means can be configured as heater coils. The heating means may be configured to be in direct contact to the aluminium workpiece during heat treatment which results in an improved thermal transfer.

The heating zone may comprise a single section or multiple sections which are spaced apart from each other. Multiple sections allow to individually heat different sections of the aluminium workpiece to cause locally dependent structural state changes.

The cooling means are preferably configured as heat exchanger, especially using a cooling fluid like water. Alternatively, the cooling means may be configured as means for directly exposing the aluminium workpiece to a cooling fluid like water, oil or steam. The cooling fluid can for example be sprayed onto the workpiece surface. Thermoelectric cooling elements are also conceivable.

Aluminium workpieces have high thermal conductivity, especially higher thermal conductivity than comparable steel workpieces. Therefore a high heat transfer from the aluminium workpiece to the cooling means is advantageous to prevent heat dissipation from the first portion to the second portion of the aluminium workpiece. The cooling means may therefore be configured to be in direct contact to the aluminium workpiece during heat treatment which results in an improved thermal transfer. The cooling means may moreover be configured to establish a heat transfer from the aluminium workpiece to the cooling means which is at least as high as the heat transfer within the aluminium workpiece. Especially a part of the cooling means which is in direct contact with the aluminium workpiece may comprise a material, such as copper, with at least the same, preferably with a higher heat transfer coefficient than aluminium. In this way the heat will diffuse into the cooling means rather than staying in the aluminium.

Alternatively or in addition to the aforesaid the cooling means may be configured to maintain a temperature which is at least 10° C., preferably at least 25° C., especially at least 40° C. lower than the temperature of the portion of the aluminium workpiece located in the cooling zone. The cooling means may be controlled to keep this temperature difference throughout the first precipitation hardening process.

The cooling zone may comprise a single section or multiple sections which are spaced apart from each other. Multiple sections allow to individually cool different sections of the aluminium workpiece to locally dependently prevent structural state changes during heat treatment.

According to a first preferred embodiment of the apparatus according to the invention the apparatus further comprises control means for controlling the heating means and/or the cooling means, especially for controlling the temperature within a portion of an aluminium workpiece located in the heating zone and/or within a portion of an aluminium workpiece located in the cooling zone.

This feature allows controlling of the heating means and/or the cooling means during the thermal treatment so that an individual and locally dependent heat treatment of the workpiece can easily be achieved. The control means are preferably configured to control the heating time and/or the heating temperature. The control means are also preferably configured to control the cooling time and/or the cooling temperature. The control means may be configured as electronic, electric and/or mechanical control means to, for example, turn on or off the heating and/or cooling means or to provide them with more or less heating or cooling power, respectively.

The control means, the heating means and/or the cooling means are furthermore preferably configured to maintain a temperature within the heating zone of at least 100° C., especially of between 110° C. and 200° C. and to maintain a temperature within the cooling zone of less than 100° C., especially of less than 90° C., during a thermal treatment for at least 10 min., preferably at least 1 h, more preferably at least 7 h.

The strongest T6 state for AA 6XXX type alloys is typically achieved after 16 hours at 160° C. Therefore, the control means, the heating means and/or the cooling means are preferably configured to maintain a temperature within the heating zone of at least 160° C. and to maintain a temperature within the cooling zone of less than 100° C. for at least 16 hours.

The strongest T6 state for AA 7XXX type alloys is typically achieved after 36 hours at 120° C. Therefore, the control means, the heating means and/or the cooling means are preferably configured to maintain a temperature within the heating zone of at least 120° C. and to maintain a temperature within the cooling zone of less than 100° C. for at least 36 hours.

As the typical treatment times for aluminium workpieces are longer than for comparable steel workpieces it is in particular advantageous when using a heat exchanger as cooling means to cool the cooling medium of the heat exchanger, e.g. water, before being returned to the heat exchanger.

In a further preferred embodiment the apparatus also comprises feedback means, especially comprising one or more temperature sensors and a feedback loop, so that the temperature within the heating zone and/or within the cooling zone can be controlled precisely.

In a further embodiment of the apparatus the apparatus comprises adjustment means for adjusting the position and/or the size of the heating zone and/or the cooling zone.

The adjustment means allow to configure or reconfigure the apparatus to adapt the heating and/or cooling zones to the demands of a specific workpiece. The position and the size of the portions of the aluminium workpieces which are located in the heating and/or the cooling zone can thus be selected on demand.

The adjustment means are preferably configured as electronic, electrical and/or mechanical means. For example, the adjustment means may be configured such that it is possible to turn on or off parts of the heating means and/or cooling means or to move at least in part the heating means and/or cooling means to different positions of the treatment room. In this way the apparatus can be configured for different thermal treatments which involve different positions and sizes of workpiece portions undergoing structural state changes.

In a further preferred embodiment of the apparatus the apparatus is configured as a press. A press is used to form aluminium workpieces to a specific shape. This embodiment combines the steps of forming the aluminium workpiece and subjecting it to a locally dependent thermal treatment to achieve structural changes within certain portions of the workpiece. Due to this combination of two steps the production process of the workpiece is rendered more efficient. Moreover, the number of apparatuses necessary for producing such an aluminium workpiece is reduced resulting in space and cost savings. In a preferred embodiment a conventional press is equipped with a heater and/or a cooler for this purpose.

The object derived above is also solved by an aluminium workpiece, especially producible with a method as described above, wherein a first portion of the aluminium workpiece is essentially in the T6 structural state and a second portion of the aluminium workpieces is essentially in the T7 structural state.

Aluminium workpieces with portions of different structural states having different characteristics such as strength and ductility are for example suitable to replace steel components in applications where locally dependent material characteristics are needed.

In a preferred embodiment the workpiece comprises a transition zone located between the first portion and the second portion of the aluminium workpiece, the structural state in the transition zone showing a transition, preferably a continuous transition, from the structural state of the first portion to the structural state of the second portion. A defined transition zone has the advantage that the workpiece does not show an abrupt change of material characteristics which could give rise to a weak point of the workpiece. The size of the transition zone is preferably less than 25 cm, more preferably less than 15 cm, in particular less than 9 cm.

The aluminium workpiece preferably consists of an AA2XXX or AA6XXX or AA7XXX alloy, preferably AA6070, AA6082 or AA6009, as these alloys have T6 structural states with very high strength and T7 structural states with good ductility. Such workpieces can therefore provide good characteristics in terms of strength and ductility after a precipitation hardening.

Good material characteristics may for example be achieved in that the workpiece consists of AA 6070, the first portion has a yield strength of at least 350 MPa and a tensile strength of at least 370 Mpa and the second portion has an elongation at break of at least 10%, or in that the workpiece consists of AA 6082, the first portion has a yield strength of at least 250 Mpa and a tensile strength of at least 290 Mpa and the second portion has an elongation at break of at least 12%, or in that the workpiece consists of AA 6009, the first portion has a yield strength of at least 300 Mpa and a tensile strength of at least 320 Mpa and the second portion has an elongation at break of at least 14%.

In another preferred embodiment of the aluminium workpiece the workpiece is configured as part of a vehicle body, especially as a B-pillar. Parts of a vehicle body such as B-pillars often require portions with different characteristics in terms of strength or ductility. Therefore vehicle body parts are a natural field of application for the aluminium workpiece as described above. This aluminium workpiece is lighter than steel and easier to produce than aluminium workpieces produced with conventional methods.

A B-pillar is one example for a workpiece requiring portions with different material characteristics. A B-pillar preferably has an upper portion of high strength, i.e. essentially T6 structural state, to ensure a sufficient roll-over protection. The lower portion of the B-pillar preferably has higher ductility or elongation, i.e. essentially T7 structural state, to improve the capability of crash energy absorption.

A further embodiment of the invention consists in an apparatus for thermally treating an aluminium workpiece comprising a treatment room configured to accommodate at least a part of an aluminium workpiece during a thermal treatment and a heater configured to heat up at least that portion of an aluminium workpiece which is located in a heating zone of the treatment room, wherein the apparatus further comprises a cooler configured to actively cool at least that portion of an aluminium workpiece which is located in a cooling zone of the treatment room. The apparatus preferably further comprises a controller for controlling the heater and/or the cooler. The apparatus preferably comprises an adjuster for adjusting the position and/or the size of the heating zone and/or of the cooling zone. The apparatus is preferably a press.

It goes without saying that the features described for the method may accordingly be combined with the apparatus and/or the workpiece according to the invention, and vice versa. Especially, in a preferred embodiment of the method according to the invention, the first and more preferably also the second precipitation hardening is carried out by using an apparatus according to the invention.

BRIEF DESCRIPTION OF THE DRAWINGS

Further features and advantages of the apparatus, the method and the aluminium workpiece are presented in the following by exemplary embodiments with reference to the figures.

FIGS. 4a-b show a second exemplary embodiment of the apparatus and the workpiece according to the invention and another exemplary embodiment of the method according to the invention.

FIG. 5 shows a third exemplary embodiment of the apparatus and the workpiece according to the invention and another exemplary embodiment of the method according to the invention.

DETAILED DESCRIPTION OF THE INVENTION

Figure 1:
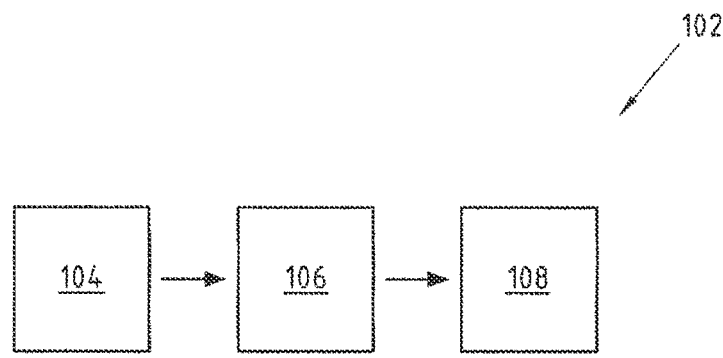
FIG. 1 shows a first exemplary embodiment of the method according to the invention.

FIG. 1 shows a first exemplary embodiment of the method according to the invention. In method 102 an aluminium workpiece is provided in a first step 104. The workpiece is essentially in the T4 structural state.

In a subsequent step 106 a first portion of the workpiece is exposed to a first precipitation hardening process by artificial ageing. At the same time, a part of the workpiece is actively cooled, so that the temperature remains below the artificial ageing temperature in a second portion of the workpiece. While the precipitation hardening process causes a structural state change from T4 to T6 in the first portion, the second portion essentially remains in the T4 structural state.

In a further subsequent step 108 the workpiece is exposed to a second precipitation hardening process, wherein both the first and the second portion of the workpiece undergo a structural state change. At the end of step 108 the first portion of the workpiece is in the T7 structural state whereas the second portion is in the T6 structural state. As a consequence, the workpiece has portions of different material characteristics, namely high strength in the second portion and less strength, but higher ductility in the first portion.

Figure 2:
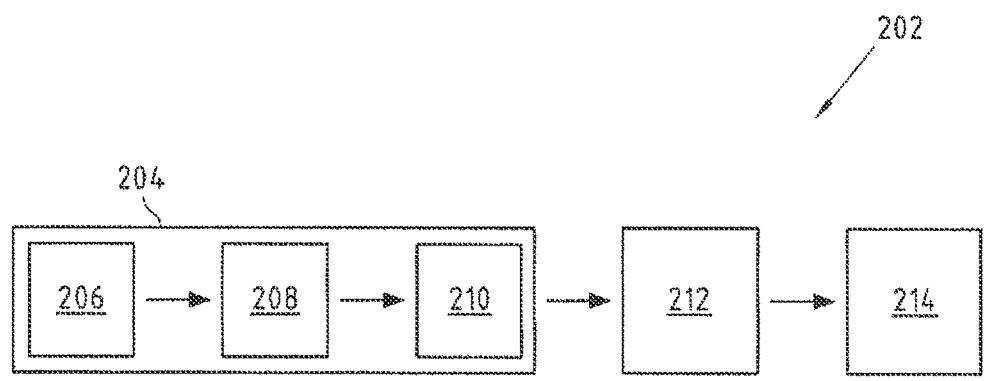
FIG. 2 shows a second exemplary embodiment of the method according to the invention.

FIG. 2 shows a second exemplary embodiment of the method according to the invention. In method 202 an aluminium workpiece which is essentially in the T4 structural state is provided in step 204. Step 204 comprises a first sub-step 206 in which the aluminium workpiece is subjected to solution annealing for 5 h at 500° C. In the second sub-step 208 the aluminium workpiece is quenched in water to a temperature of 200° C. In the third sub-step 210 the aluminium workpiece is optionally subjected to natural ageing for 5 days at ambient temperature. After step 204 the aluminium workpiece is essentially in the T4 structural state. Step 104 of the exemplary embodiment shown in FIG. 1 may comprise similar steps 206, 208 and 210.

In a subsequent step 212 the aluminium workpiece is first subjected to a second precipitation hardening process, in which a first and a second portion of the workpiece undergo a structural state change from T4 to T6.

In a further subsequent step 214 the first portion of the workpiece is exposed to a first precipitation hardening process while a part of the workpiece is actively cooled so that the second portion of the workpiece does not undergo further precipitation hardening. In step 214 the structural state of the first portion changes from T6 to T7 while the structural state of the second portion remains in T6 state. As a consequence, the workpiece has portions of different material characteristics, namely high strength in the second portion and less strength, but higher ductility in the first portion.

Figure 3:
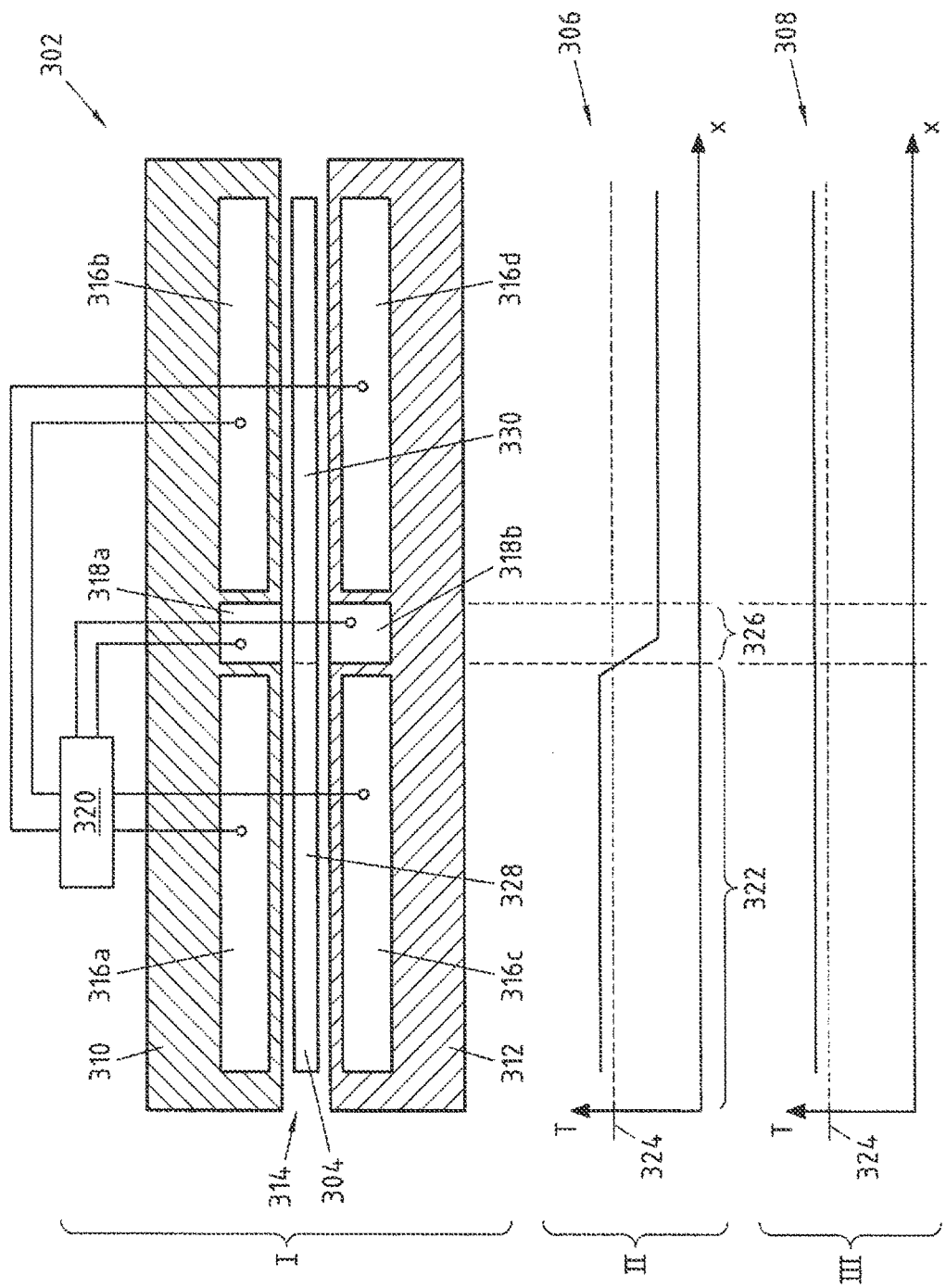
FIG. 3 shows a first exemplary embodiment of the apparatus and the workpiece according to the invention and another exemplary embodiment of the method according to the invention.

FIG. 3 shows an exemplary embodiment of the apparatus, the workpiece and the method according to the invention. FIG. 3 is divided into three parts, wherein the upper part I shows the apparatus 302 with an aluminium workpiece 304, middle part II shows a first possible temperature distribution 306 within the aluminium workpiece 304 and bottom part III shows a second possible temperature distribution 308 within the aluminium workpiece 304. Parts I, I and III are horizontally aligned so that the temperature of a specific horizontal position in the aluminium workpiece 304 can be read from the same horizontal position in the temperature distributions 306, 308.

The apparatus 302 comprises an upper part 310 and a lower part 312 partly enclosing a treatment room 314. The treatment room 314 is configured to accommodate aluminium workpiece 304 during the thermal treatment. The upper and the lower parts 310, 312 comprise heating means 316a-d which for example can be configured as electrical heating components. The upper and lower part 310, 312 also comprise cooling means 318a-b which for example can be configured as heat exchangers. Heating means 316a-d and cooling means 318a-b are controlled by control means 320, which may turn on or off these separate heating and cooling means individually.

Turning on heating means 316a and 316c defines a heating zone 322 (indicated in part II), in which a first portion 328 of the aluminium workpiece 304 located in this heating zone 322 is heated above an artificial ageing temperature 324 of for example 120° C. so that artificial ageing takes place in portion 328. By further turning on cooling means 318a-b a cooling zone 326 (shown in part II) is defined, in which a part of the workpiece 304 is actively cooled. Due to this active cooling the heat within the first portion 328 does not transfer to the rest of the aluminium workpiece so that the temperature in the region of the cooling zone and in the region of the turned-off heating means 316b and 316d stays below the artificial ageing temperature 324. With this setup, the aluminium workpiece 304 is exposed to a precipitation hardening process in the first portion 328, whereas the structural state does not change in a second portion 330.

With apparatus 302 it is also possible to subject the aluminium workpiece 304 to a second precipitation hardening process, in which both the first and second portion 328, 330 undergo precipitation hardening. For this purpose, the control means 320 turns on all four heating means 316a-d and turns off the cooling means 318a-b. In this setup temperature distribution 308 is achieved within the workpiece 304, so that the temperature rises above the artificial ageing temperature 324 in essentially the whole workpiece 304. Thus, precipitation hardening takes place in both the first and second portion 328, 330 of the workpiece 304.

Figure 4A:
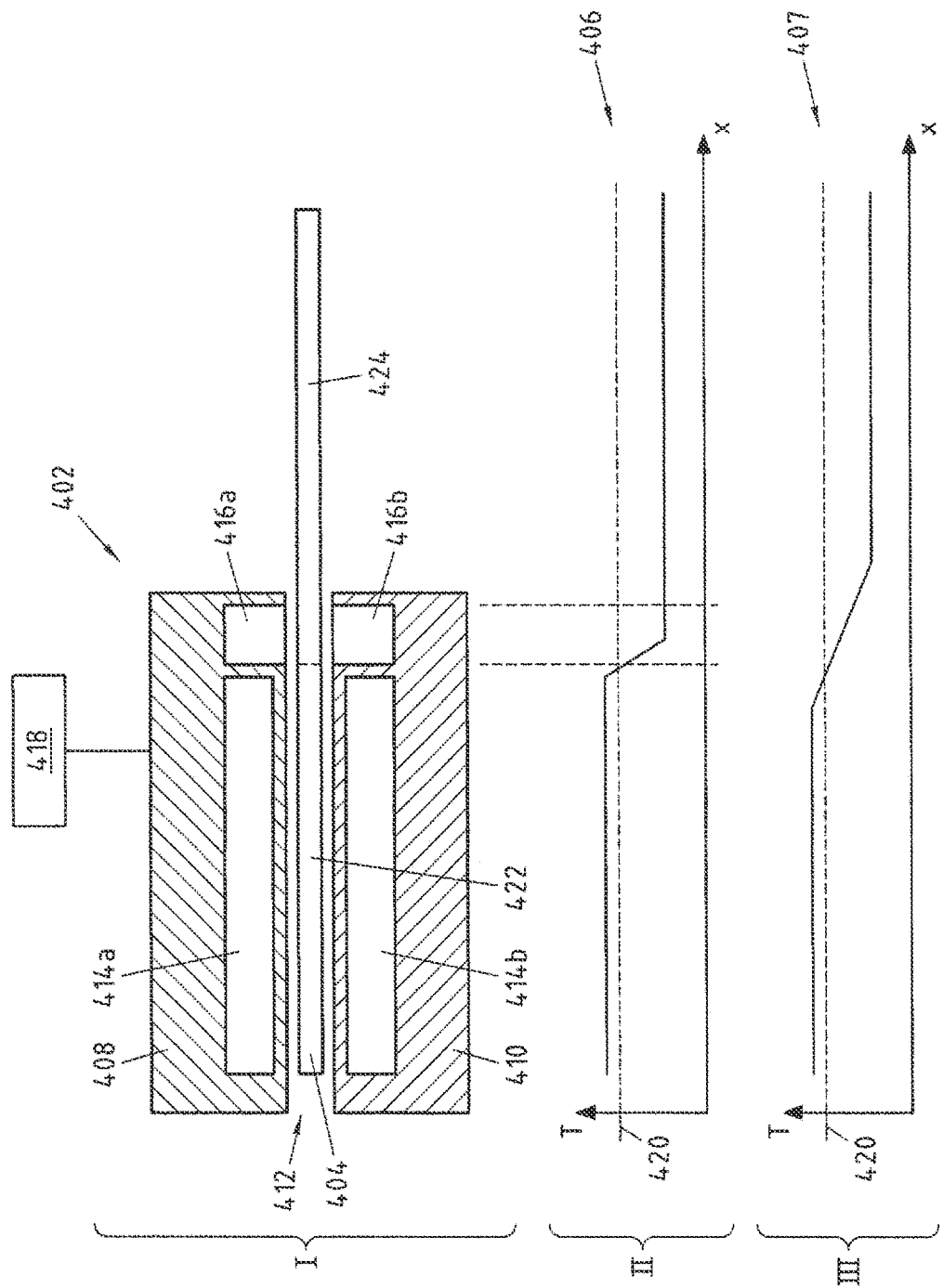

FIG. 4a shows another exemplary embodiment of the apparatus, the workpiece and the method according to the invention. FIG. 4 is divided in three parts with upper part I showing the apparatus 402 and an aluminium workpiece 404, middle part II showing a first possible temperature distribution 406 and bottom part III showing a second possible temperature distribution 407 within the workpiece 404. Parts I, II and III are horizontally aligned as in FIG. 3.

Apparatus 402 has an upper part 408 and a lower part 410 partly enclosing a treatment room 412 in which a part of the aluminium workpiece 404 is accommodated. In contrast to FIG. 3 only a part of the workpiece 404 is arranged within the treatment room 412 while another part remains outside. The apparatus 402 comprises heating means 414a-b and cooling means 416a-b and control means 418 to control the heating and cooling means. When all heating means 414a-b and cooling means 416a-b are turned on the aluminium workpiece 404 shows the temperature distribution 406.

Heating means 414a-b heat a first portion 422 of the workpiece 404 to a temperature above an artificial ageing temperature 420, whereas the cooling means 416a-b by actively cooling a part of the workpiece 404 keep the temperature below the artificial ageing temperature 420 in a second portion 424 of the workpiece. Therefore the initially overall T4 structural state of the aluminium workpiece 404 changes to T6 in first portion 422 while remaining essentially T4 in second portion 424.

By controlling the heating power of the heating means 414a-b and/or the cooling power of the cooling means 416a-b with control means 418 the temperature gradient between the first portion 422 and second portion 424 can be modified. For example the temperature gradient can be controlled to be smaller, so that it extends over a broader area of the workpiece as shown in temperature distribution 406. The workpiece 404 then has a broader transition region in which the material characteristics gradually change between the characteristics of the first and the second portion 422, 424.

Preceding or subsequent to the heat treatment in apparatus 402, the aluminium workpiece 404 may be heat treated in a conventional thermal treatment apparatus 430 as shown in FIG. 4b to perform a second precipitation hardening process for both the first and second portion 422 and 424 of the workpiece 404. The thermal treatment apparatus 430 is configured as a furnace with heating means 432a-b to heat the whole workpiece to a temperature above the artificial ageing temperature 420. With apparatus 430 a heat distribution is achievable in the workpiece 404 as shown in part III of FIG. 3.

FIG. 5 shows another exemplary embodiment of the apparatus, the workpiece and the method according to the invention. FIG. 5 is divided into three parts wherein upper part I shows apparatus 502 with an aluminium workpiece 504, middle part II shows a first possible temperature distribution 506 and bottom part III shows a second possible temperature distribution 507 within workpiece 504. Parts I, II and III are horizontally aligned as in FIG. 3.

The apparatus 502 comprises an upper part 508 and a lower part 510 enclosing a treatment room 512 in which the workpiece 504 is accommodated. The treatment room 512 is essentially completely closable for heat treatment in this example. The apparatus 502 further comprises heating means 514a-h as well as cooling means 516a-h. The heating and cooling means can be controlled individually by control means 518. The control means 518 can turn on and off the heating and cooling means independently from each other, so that different temperature distributions can be achieved within workpiece 504.

With heating means 514a-b and 514e-f and cooling means 516c and 516g and optionally also 516b and 516h turned on, temperature distribution 506 can be achieved, so that the aluminium workpiece is heated up to or above an artificial ageing temperature 520 in a first portion 522 for causing a structural state change in this portion, whereas the temperature remains below the artificial ageing temperature 520 in a second portion 524 so that the structural state essentially remains unchanged here.

With heating means 514a, 514c, 514e and 514g and cooling means 516b, 516d, 516f and 516h turned on instead, temperature distribution 507 can be achieved, so that the workpiece 504 undergoes a structural state change in two sections of a first portion of the workpiece 504 where the temperature is above the artificial ageing temperature 520.

By turning on all heating means and turning off all cooling means also a temperature distribution as shown in part III of FIG. 3 can be achieved so that apparatus 502 can be used for a second precipitation hardening process of the whole workpiece as well.

Figure 6:
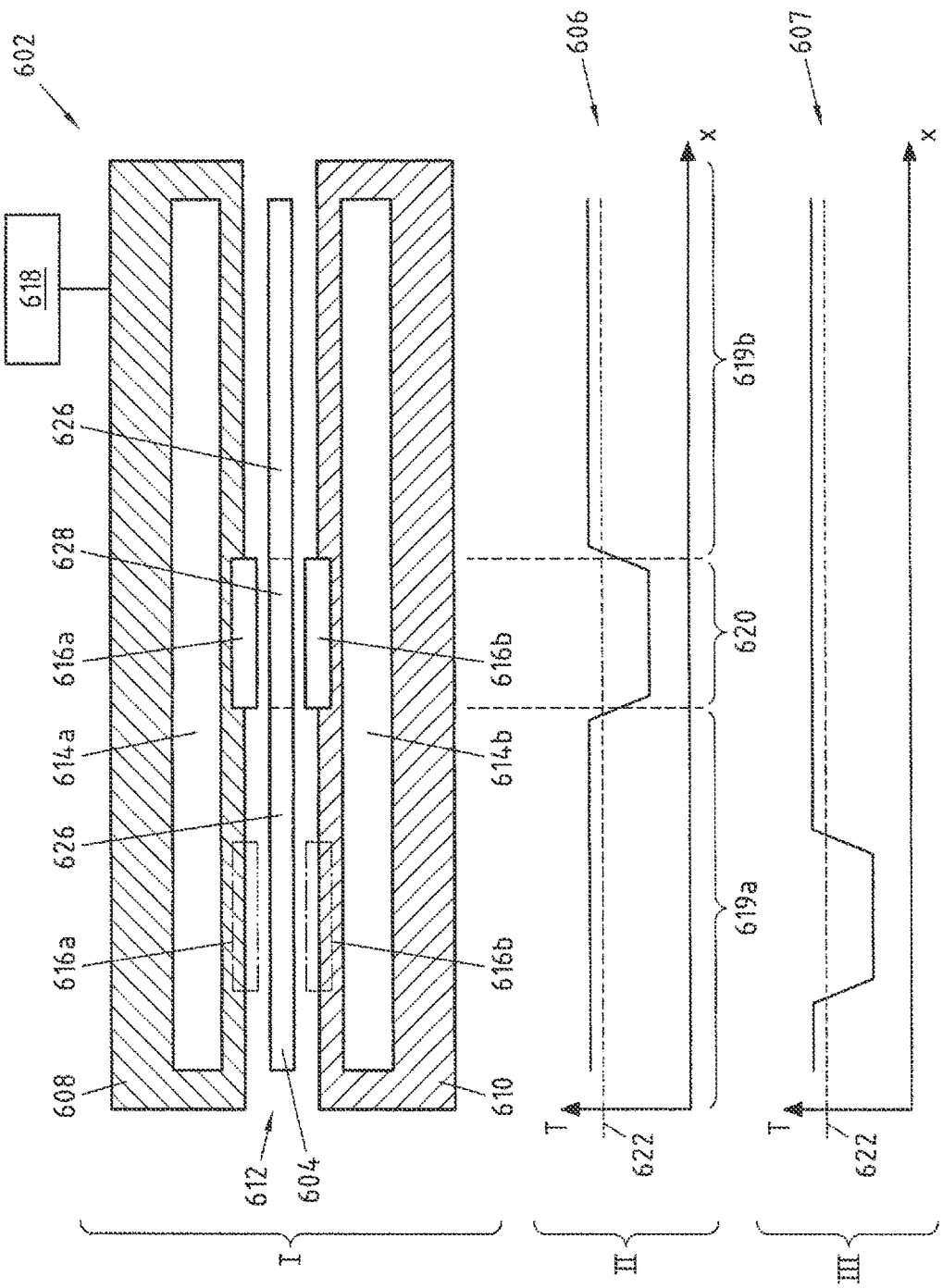
FIG. 6 shows fourth exemplary embodiment of the apparatus and the workpiece according to the invention and another exemplary embodiment of the method according to the invention.

FIG. 6 shows another exemplary embodiment of the apparatus, the workpiece and the method according to the invention. FIG. 6 is divided into three parts wherein upper part I shows apparatus 602 with an aluminium workpiece 604, middle part II shows a first possible temperature distribution 606 and bottom part III shows a second possible temperature distribution 607 within the aluminium workpiece 604.

Apparatus 602 comprises an upper part 608 and a lower part 610 which enclose a treatment room 612 in which the workpiece 604 is located. The apparatus further comprises heating means 614a-b and cooling means 616a-b as well as a control means 618 to control the heating and cooling means. The cooling means 616a-b are moveable along the horizontal direction of the treatment room 612. Part I of FIG. 6 exemplarily shows a first location (solid lines) and a second location (dash-dotted line) of the cooling means 616a-b.

With the cooling means 616a-b in the first location and both heating means 614a-b and cooling means 616a-b turned on, the temperature distribution 606 can be achieved in the workpiece. In this configuration the apparatus 602 has a two-section heating zone 619a-b in which a two-section first portion 626 of the workpiece 604 is heated up to or above artificial ageing temperature 622. The apparatus 602 also has a one-section cooling zone 620 in which a second portion 628 of the workpiece 604 is kept below artificial ageing temperature 622. During heat treatment the two-section first portion 626 undergoes a structural state change while the structural state of the second portion 628 essentially remains unchanged.

By moving the cooling means 616a-b to the position of the cooling zone 620 and accordingly of the second portion 628 of the workpiece 604 can be individually set. When the cooling means 616a-b are in the second location (dash-dotted line) temperature distribution 607 can be achieved within the workpiece.

By turning off the cooling means 616a-b it is also possible to achieve a temperature distribution as shown in part III of FIG. 3 and therewith to perform second precipitation hardening of both the first and second portion 626, 628 of the workpiece 604 in apparatus 602.

Figure 7A:
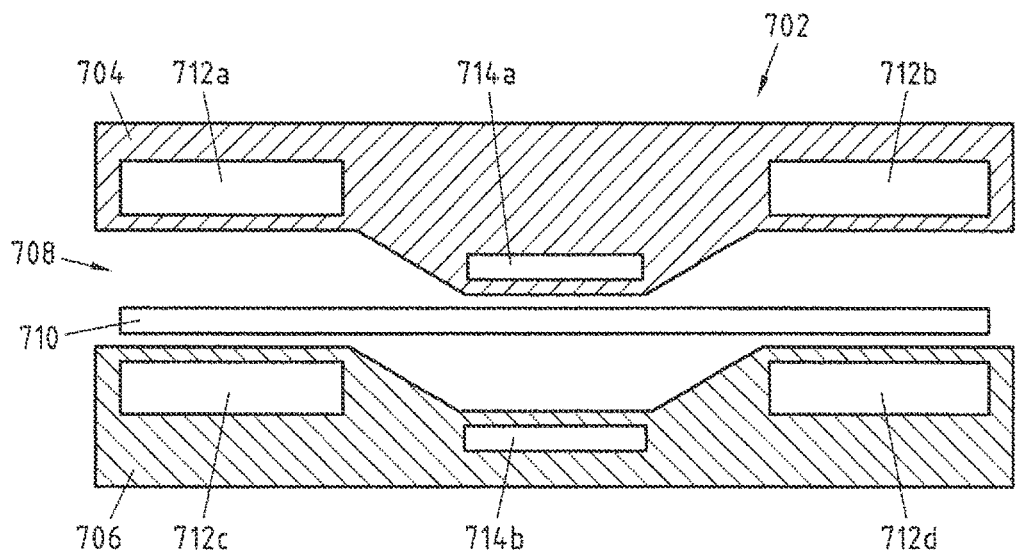
FIGS. 7a-c show a fifth exemplary embodiment of the apparatus and the workpiece according to the invention and another exemplary embodiment of the method according to the invention.
Figure 7B:
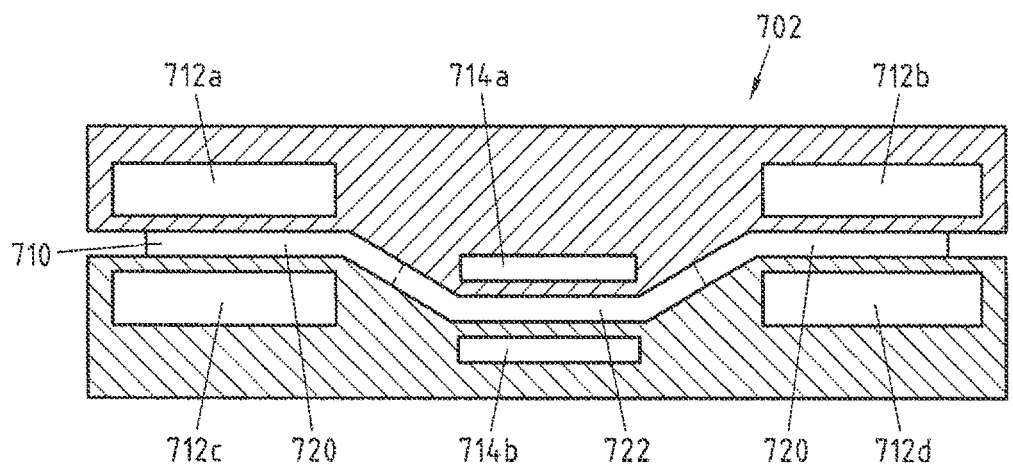

FIGS. 7a and 7b show another exemplary embodiment of the apparatus and the method according to the invention.

The apparatus 702 is configured as a press and comprises an upper part 704 configured as a ram and a lower part 706 configured as a press frame. Upper and lower parts 704, 706 in part enclose a treatment room 708 in which an aluminium workpiece 710 can be accommodated. The apparatus 702 further comprises heating means 712*a-d* and cooling means 714*a-b* as well as control means (not shown) to control the press and/or the heating and/or cooling means.

Figure 7C:
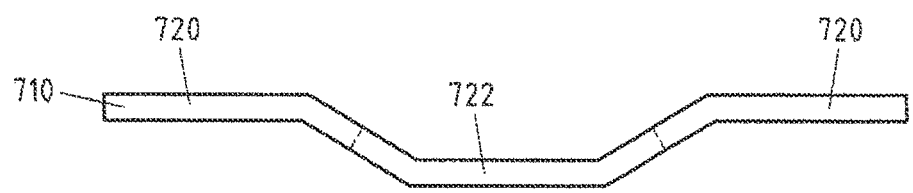

Workpiece 710 may be formed to a specific shape by closing the press as shown in FIG. 7*b*. During or after this pressing process heating means 712*a-d* and cooling means 714*a-b* are activated so that the aluminium workpiece 710 undergoes precipitation hardening in a two-section first portion 720*a* while its structural state essentially remains unchanged in a second portion 722. The final workpiece 710 is shown in FIG. 7*c*.

With apparatus 702 workpiece 710 can be formed and heat treated in a single step within a single apparatus. This allows for a more efficient and economic production of aluminium workpieces.

Figure 8:
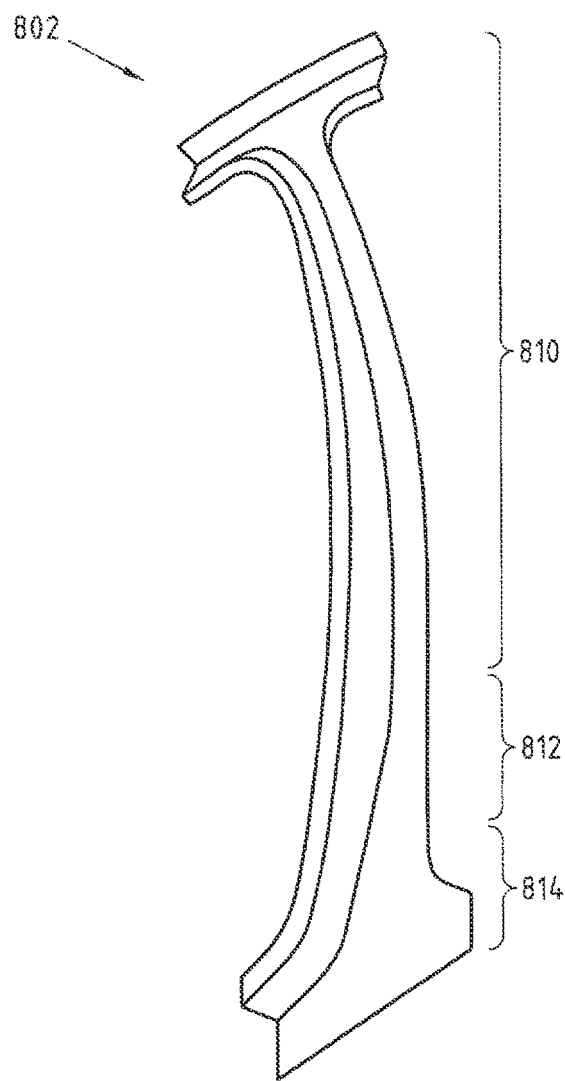
FIG. 8 shows another exemplary embodiment of the aluminium workpiece according to the invention.

FIG. 8 shows an exemplary embodiment of an aluminium workpiece according to the invention. The aluminium workpiece 802 was manufactured with a method according to the invention using an apparatus according to the invention.

Aluminium workpiece 802 is configured as a B-pillar of a vehicle body with an upper part 810, a middle part 812 and a lower part 814. The upper part 810 forms a first portion of the workpiece 802 and is essentially in the T6 structural state with a very high strength. The lower part 814 forms a second portion of the workpiece 802 and is essentially in the T7 structural state with less strength than the upper part 810 but with increased ductility. The middle part 812 is a transition portion, in which the structural state and therefore also the strength and ductility show a transition from the upper to the lower part.

With these locally dependent material characteristics workpiece 802 is suitable to replace a respective steel component of a vehicle body. The high strength upper part guarantees a sufficient roll-over protection while the higher ductility in the lower part 814 offers better crash energy absorption capability. Workpiece 802 is preferably made of AA 6XXX or AA 7XXX aluminium alloy, in particular AA 6070 alloy or stronger.

Figure 9:
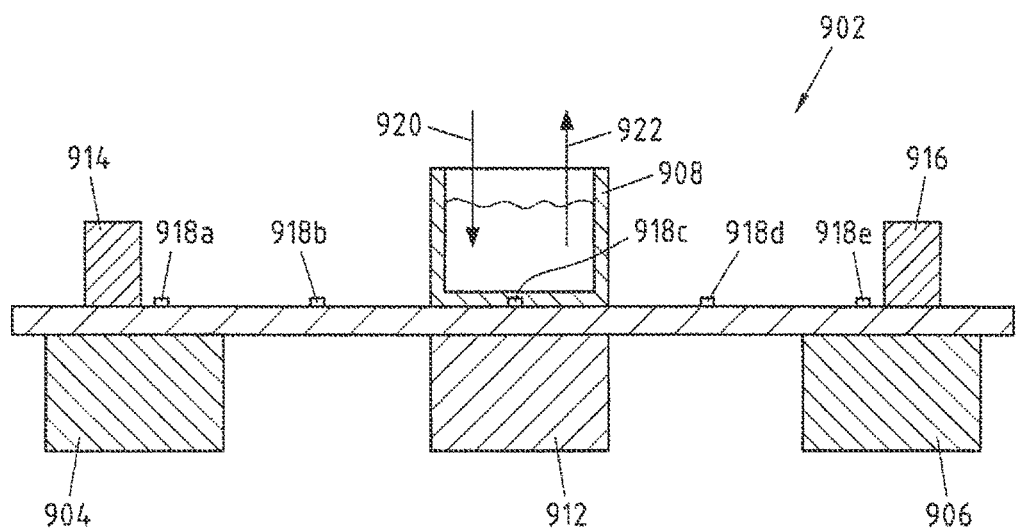
FIG. 9 shows a test setup for testing the operability of the method and the apparatus according to the invention.

FIG. 9 shows a test setup for testing the operability of the method and the apparatus according to the invention. Test setup 902 comprises a first and second electrical heating plate 904, 906 as first and second heating means and a heat exchanger 908 as cooling means. An aluminium sheet 910 is placed on top of the first and second heating plates 904, 906 and on a backing 912. The heat exchanger 908 and two weights 914, 916 are placed on top of the aluminium sheet 910 so that the aluminium sheet 910 stays in thermal contact with heating plates 904, 906 and heat exchanger 908 during the tests. Five temperature sensors 918*a-e* are attached to the upper surface of the aluminium sheet 910 to monitor the temperature of the aluminium sheet 910 at different positions during the tests.

The heat exchanger 908 is configured as a water bath with a water inlet (arrow 920) and a water outlet (arrow 922). During the tests water can be continuously pumped through the heat exchanger 908 to provide for a sufficient cooling of the aluminium sheet 910.

Figure 10A:
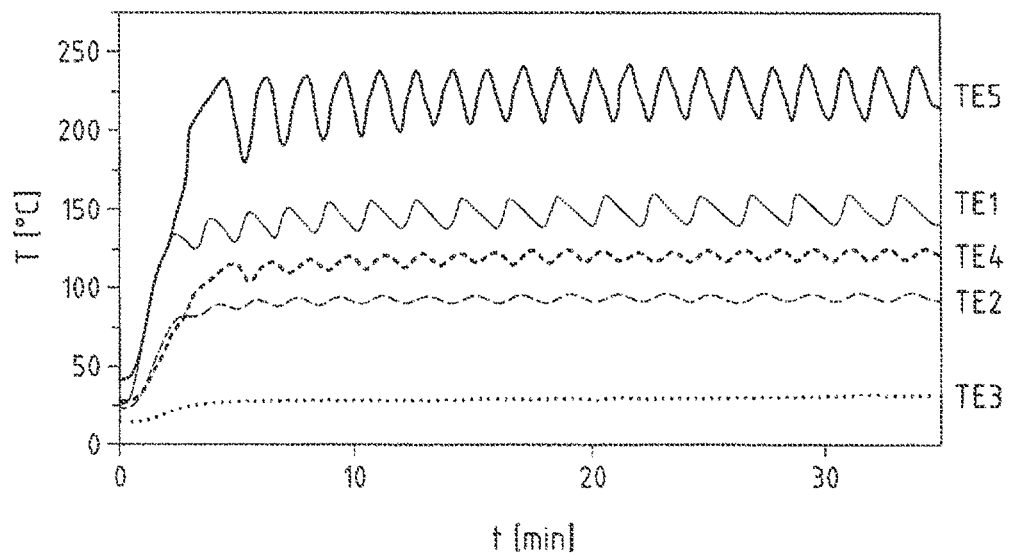
FIGS. 10a-b show results from a first test carried out with a test setup as shown in FIG. 9.
Figure 10B:
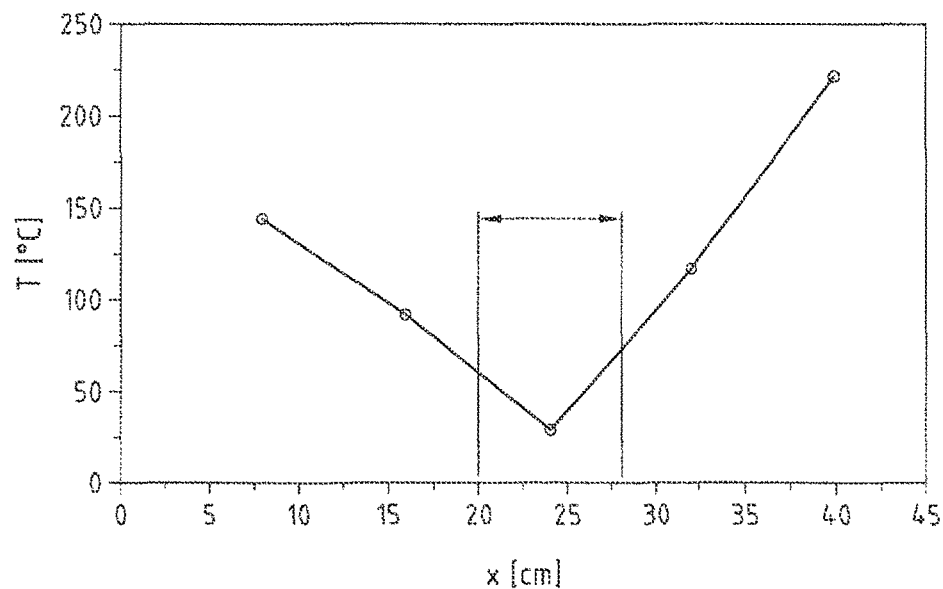

FIGS. 10*a-b* show results from a first test carried out with a test setup as shown in FIG. 9. During the first test both heating plates 904, 906 were activated to locally heat the aluminium sheet 910 to a preset temperatures of about 140° C. and about 210° C., respectively. Furthermore water was pumped continuously through heat exchanger 908 to provide for sufficient cooling.

FIG. 10*a* shows the result of temperature measurements from the five temperature sensors 918*a-e* over time. Measured curve TE1 corresponds to sensor 918*a*, measured curve TE2 corresponds to sensor 918*b* and so on. All curves TE1 to TE5 show a temperature rise during the first minutes after the heating plates 904, 906 were turned on. After about five minutes all curves TE1 to TE5 show saturation at different temperature values. The oscillations of the curves around these temperature values are due to the temperature control circuits of heating plates 904, 906.

Measured curves TE1 and TE5 show the temperatures of the aluminium sheet 910 in the area where the sheet is in direct contact with heating plates 904, 906; curve TE3 shows the temperature of the aluminium sheet 910 in the area where the sheet is in direct contact with heat exchanger 908; and curves TE2 and TE4 show the temperatures of the aluminium sheet 910 in the area between the heating plates 904, 906 and heat exchanger 908.

FIG. 10*b* shows the average temperatures measured at sensors 918*a-d* after reaching the saturated temperature distribution, i.e. about 5 minutes after start of the test. The abscissa shows the relative lateral position of the sensors, wherein the most left point corresponds to sensor 918*a* and the most right point corresponds to sensor 918*d*. The double arrow marks the lateral width of the heat exchanger, i.e. the zone of active cooling.

FIGS. 10*a* and 10*b* show that it was possible to reach artificial ageing temperatures in a first section of the aluminium sheet 910, namely in the parts closest to heating plate 904 and 906, respectively, while at the same time keeping the temperature below artificial ageing temperature, in particular below about 100° C. in a second portion of the aluminium sheet 910 close to the heat exchanger 908. These respective temperatures could also be kept for a time period of more than about 30 minutes.

Figure 11:
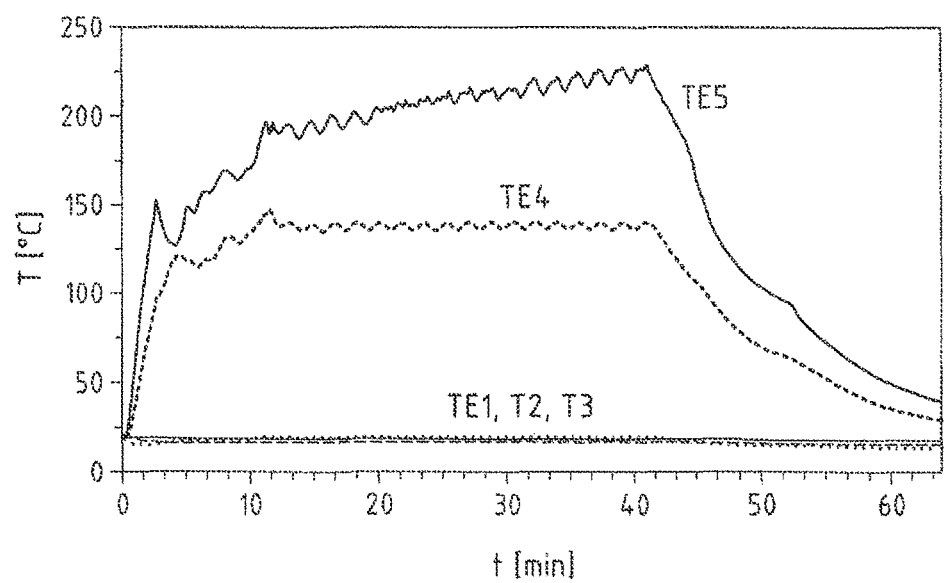
FIG. 11 shows results from a second test carried out with a test setup as shown in FIG. 9.

FIG. 11 shows results from a second test carried out with a test setup as shown in FIG. 9. The results are presented in the same way as in FIG. 10*a*. During the second test only heating plate 906 was activated to locally heat the aluminium sheet 910 to a preset temperature of about 200° C. Furthermore water was pumped continuously through heat exchanger 908 to provide for sufficient cooling.

Curve T5 in FIG. 11 shows that an artificial ageing temperature of about 200° C. was achieved about 12 minutes after turning on heating plate 906 and until turning off the heating plate 906 after about 40 minutes. At the same time curves T1 to T3 show that the part of the aluminium workpiece 910 at the heat exchanger 908 and at the turned-off heating plate 904 remained at room temperature level.

In summary both tests show that it is possible in general to achieve a temperature distribution within an aluminium workpiece with the method and the apparatus according to the invention, respectively, which temperature distribution causes artificial ageing in a first portion of the workpiece while the structure remains essentially unchanged in a second portion of the workpiece.

With the method and the apparatus according to the invention workpieces may be produced which have a first portion of essentially T6 structural state and a second portion of essentially T7 structural state. Examples for such workpieces are given in the following table:

| Nr. | Alloy | Portion | Structural state | $R_{p0,2}$ [MPa] | $R_m$ [MPa] | $A_{50}$ [%] |
|---|---|---|---|---|---|---|
| 1 | AA 6070 | 1 | T6 | 375 | 395 | 8 |
|   |         | 2 | T7 | 340 | 360 | 14 |
| 2 | AA 6082 | 1 | T6 | 260 | 300 | 10 |
|   |         | 2 | T7 | 230 | 275 | 15 |
| 3 | AA 6009 | 1 | T6 | 320 | 340 | 12 |
|   |         | 2 | T7 | 290 | 310 | 16 |

Three T4 Al alloy sheets made from different Al alloys as designated in the second column of the table are exposed to a first and a second precipitation hardening process. During the first precipitation hardening process a first portion of each workpiece is held at a precipitation hardening temperature for a defined length of time, for example at about 205° C. for 1 h for AA 6009, while a second portion of the workpiece is held below 100° C. by active cooling of a part of the workpiece. During the second precipitation hardening process both the first and the second portion of each workpiece is held at a precipitation hardening temperature for a defined length of time. After the second precipitation hardening process the first portion of each workpiece ("1" in column 3) has T6 structural state and the second portion ("2" in column 3) has T7 structural state.

The $R_{p0,2}$ yield strengths, the $R_m$ tensile strengths and the elongations at break $A_{50}$ of the respective portions of the workpieces are given in columns 5 to 7. $R_{p0,2}$, $R_m$ and $A_{50}$ are determined according to DIN EN 10002. $A_{50}$ is determined with an initial measured length of the test specimen of 50 mm.

The examples above show that workpieces are producible with the method according to the invention which for example may have the following characteristics:

| Type | Alloy | Portion | Structural state | $R_{p0,2}$ [MPa] | $R_m$ [MPa] | $A_{50}$ [%] |
|---|---|---|---|---|---|---|
| A | AA 6070 | 1 | T6 | >350 | >370 | (<10) |
|   |         | 2 | T7 | (<350) | (<350) | >10 |
| B | AA 6082 | 1 | T6 | >250 | >290 | (<12) |
|   |         | 2 | T7 | (<250) | (<290) | >12 |
| C | AA 6009 | 1 | T6 | >300 | >320 | (<14) |
|   |         | 2 | T7 | (<300) | (<320) | >14 |

The parameters in parentheses are optional, so that respective workpieces producible with the method according to the invention may also deviate from the respective values in the table above.

The invention claimed is:

1. A method for thermally treating an aluminium workpiece, comprising the steps of providing an aluminium workpiece, which is in the T4 structural state, and exposing a first portion of the workpiece to a first precipitation hardening process by artificial ageing to change the structural state of the first portion of the workpiece, wherein a part of the workpiece is actively cooled during the first precipitation hardening process to prevent a second portion of the workpiece from being directly heated and/or being indirectly heated by heat transfer from the first portion to a second portion of the workpiece, so that the second portion of the workpiece remains in the same structural state during the first precipitation hardening process, the second portion enclosing a part of the workpiece that is not directly cooled but separated from the first portion by the actively cooled part of the workpiece.

2. The method according to claim 1, wherein the method further comprises a step of exposing the workpiece to a second precipitation hardening process by artificial ageing to change the structural state of the first and the second portion of the workpiece.

3. The method according to claim 2, wherein after the first and the second precipitation hardening processes the first portion of the workpiece is in the T7 structural state and the second portion of the workpiece is in the T6 structural state.

4. The method according to claim 1, wherein a second precipitation hardening process is carried out after the first precipitation hardening process.

5. The method according to claim 1, wherein the first precipitation hardening process is carried out after a second precipitation hardening process.

6. The method according to claim 1, wherein the aluminium workpiece is made from an AA 2XXX or an AA 6XXX or an AA 7XXX aluminium alloy.

7. The method according to claim 1, wherein a second precipitation hardening process is a paint baking step.

8. The method according to claim 6, wherein the aluminium workpiece is made from AA 6070, AA 6082 or AA 6009.

* * * * *